United States Patent
Hally et al.

(10) Patent No.: US 8,933,168 B2
(45) Date of Patent: Jan. 13, 2015

(54) ACTIVATORS FOR TWO PART CYANOACRYLATE ADHESIVES

(75) Inventors: William Hally, Naas (IE); Emer Ward, Rathfarnham (IE); Patricia A. Hedderman, Cabinteely (IE); Deborah A. Moore, Tallaght (IE); Dermot F. Heatley, Dunlavin (IE)

(73) Assignee: Henkel IP & Holding GmbH, Duesseldorf (DE)

( * ) Notice: Subject to any disclaimer, the term of this patent is extended or adjusted under 35 U.S.C. 154(b) by 285 days.

(21) Appl. No.: 13/090,589

(22) Filed: Apr. 20, 2011

(65) Prior Publication Data

US 2011/0196092 A1    Aug. 11, 2011

Related U.S. Application Data

(63) Continuation of application No. PCT/EP2009/063833, filed on Oct. 21, 2009.

(60) Provisional application No. 61/107,137, filed on Oct. 21, 2008.

(51) Int. Cl.
| | |
|---|---|
| C09J 4/04 | (2006.01) |
| C09J 11/06 | (2006.01) |
| C09J 4/00 | (2006.01) |
| C08L 35/04 | (2006.01) |

(52) U.S. Cl.
CPC ... C09J 4/00 (2013.01); C08L 35/04 (2013.01)
USPC ........... 524/719; 524/710; 524/755; 524/776; 524/773; 526/205

(58) Field of Classification Search
CPC ................ C09J 4/00; C09J 4/04; C08L 35/04
USPC .......................................................... 524/719
See application file for complete search history.

(56) References Cited

U.S. PATENT DOCUMENTS

| | | | |
|---|---|---|---|
| 1,455,941 A | 5/1923 | Vanderlip | |
| 3,625,930 A | 12/1971 | Toback | |
| 3,836,377 A * | 9/1974 | Delahunty | .................... 526/205 |

(Continued)

FOREIGN PATENT DOCUMENTS

| | | |
|---|---|---|
| EP | 785 865 | 12/2002 |
| GB | 1 414 317 | 11/1975 |

(Continued)

OTHER PUBLICATIONS

Scifinder Benzothiazole similarity search conducted by Examiner on Mar. 22, 2014.*

(Continued)

*Primary Examiner* — Michael Pepitone
*Assistant Examiner* — Michael A Salvitti
(74) *Attorney, Agent, or Firm* — Steven C. Bauman

(57) ABSTRACT

There is provided a cyanoacrylate composition comprising:
a cyanoacrylate; and
a 2-substituted benzothiazole or a derivative thereof wherein the 2-substituent is an alkyl, an alkene, an alkylbenzyl, an alkylamino, an alkoxy, an alkylhydroxy, an ether, a sulfenamide, a thioalkyl or a thioalkoxy group, with the proviso that an amide portion of the sulfenamide does not have a tert butylamino or a morpholine group.

3 Claims, 6 Drawing Sheets

Bond Strengths for Two-Part CA's – part B

(56) References Cited

U.S. PATENT DOCUMENTS

| | | | |
|---|---|---|---|
| 4,665,155 A | | 5/1987 | Devaux et al. |
| 5,342,645 A | * | 8/1994 | Eisele et al. ............... 427/1 |
| 5,567,266 A | * | 10/1996 | Liu ............... 156/310 |
| 5,792,303 A | * | 8/1998 | Liu ............... 156/310 |
| 6,001,213 A | * | 12/1999 | Liu ............... 156/310 |
| 6,547,917 B1 | * | 4/2003 | Misiak et al. ............... 156/331.2 |
| 6,629,947 B1 | * | 10/2003 | Sahatjian et al. ............... 604/13 |
| 2005/0175554 A1 | * | 8/2005 | Wagner et al. ............... 424/59 |
| 2008/0020126 A1 | * | 1/2008 | Arndt ............... 427/1 |
| 2009/0068129 A1 | * | 3/2009 | Wagner et al. ............... 424/59 |
| 2011/0196092 A1 | * | 8/2011 | Hally et al. ............... 524/710 |

FOREIGN PATENT DOCUMENTS

| | | |
|---|---|---|
| GB | 1 420 409 | 1/1976 |
| GB | 1 499 851 | 2/1978 |
| JP | 1 328 480 | 8/1979 |
| JP | 62-022877 | 1/1987 |
| WO | WO 02/053666 | 7/2002 |
| WO | WO 2008/007937 | 1/2008 |
| WO | WO 2008/035375 | 3/2008 |

OTHER PUBLICATIONS

Scifinder Benzothiazole CAS# search, used in adhesives, conducted by Examiner on Mar. 22, 2014.*

Scifinder Benzothiazole CAS# search, used in cyanoacrylates, conducted by Examiner on Mar. 22, 2014.*

International Search Report for International Patent Application No. PCT/EP2009/063733 mailed on Feb. 2, 2010.

* cited by examiner

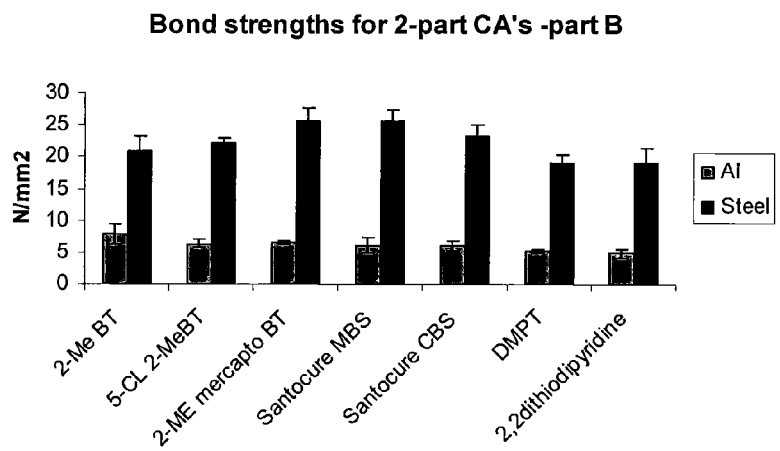
Figure 1: Bond Strengths for Two-Part CA's – part B
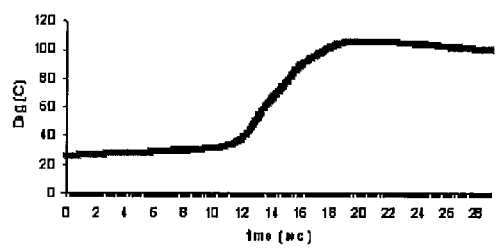
Figure 2: Cure time for adhesive using 2 (2-Me BT) as activator
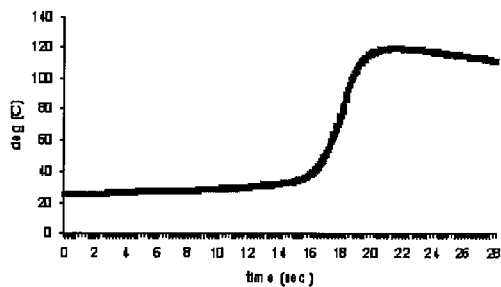
Figure 3: Cure time for adhesive using 2 (2-Me BT) as activator, after UV exposure

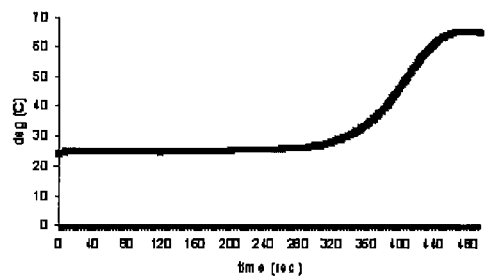
Figure 4: Cure time for adhesive using 8 (5-Cl-2-Me-BT) as activator
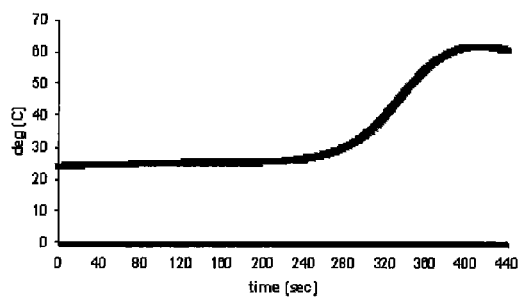
Figure 5: Cure time for adhesive using 8 (5-Cl-2-Me-BT) as activator, after UV exposure
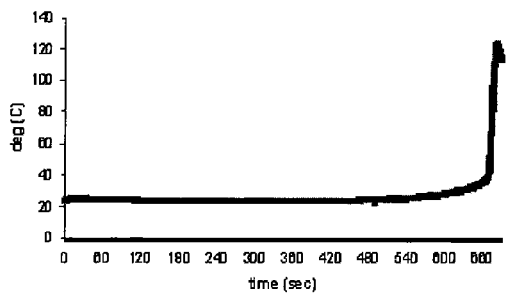
Figure 6: Cure time for adhesive using 9 (2-Me-mercapto BT) as activator

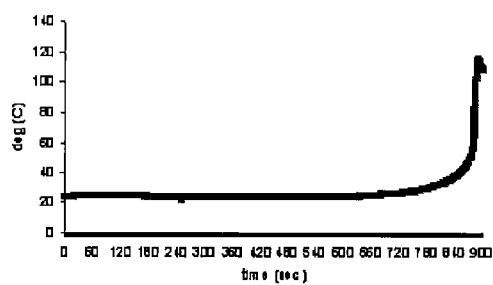
Figure 7: Cure time for adhesive using 9 (2-Me-mercapto BT) as activator, after UV exposure
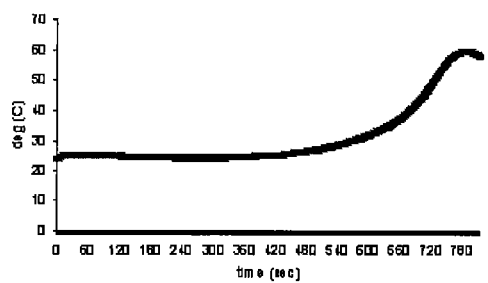
Figure 8: Cure time for adhesive using 10 (Santocure MBS) as activator
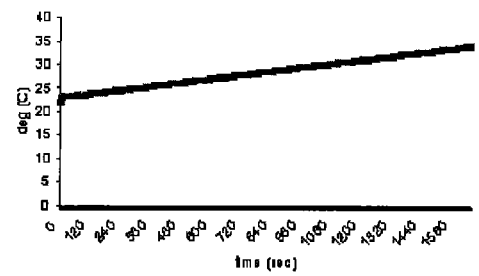
Figure 9: Cure time for adhesive using 10 (Santocure MBS) as activator, after UV exposure

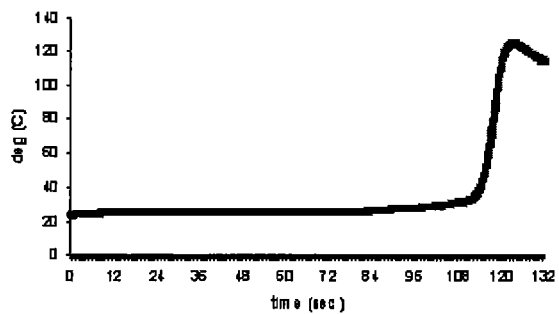
Figure 10: Cure time for adhesive using 12 (Santocure CBS) as activator
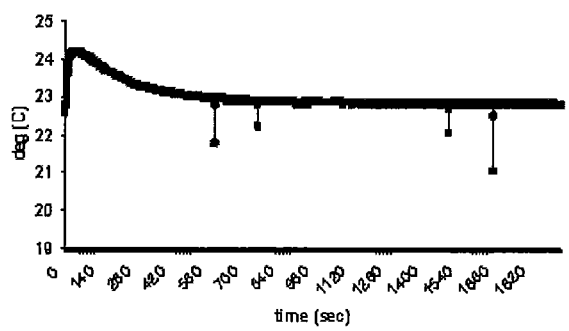
Figure 11: Cure time for adhesive using 12 (Santocure CBS) as activator, after UV exposure
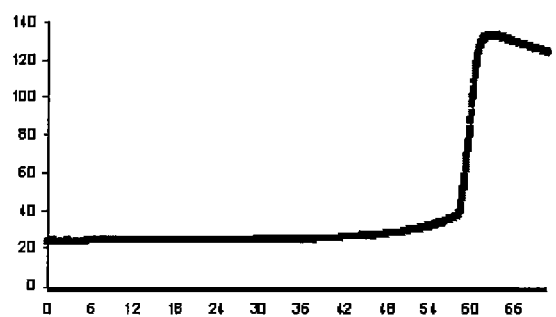
Figure 12: Cure time for adhesive using 14 (DMPT) as activator

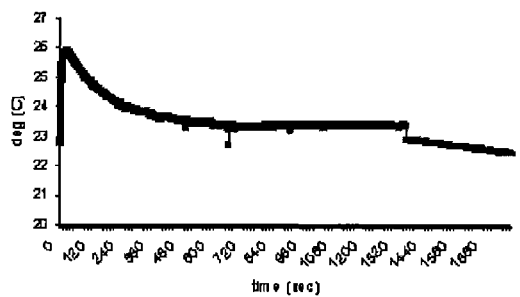
Figure 13: Cure time for adhesive using 14 (DMPT) as activator, after UV exposure
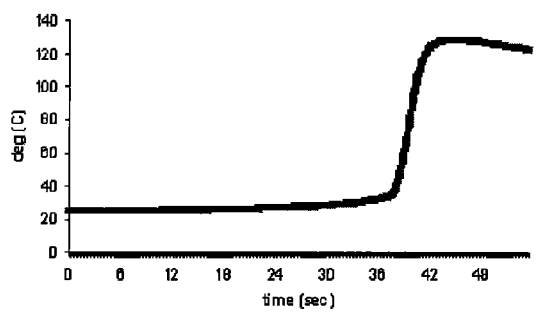
Figure 14: Cure time for adhesive using 15 (2,2 dithiopyridine) as activator
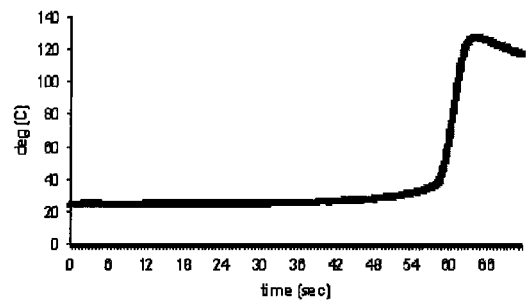
Figure 15: Cure time for adhesive using 15 (2,2 dithiopyridine) as activator, after UV exposure

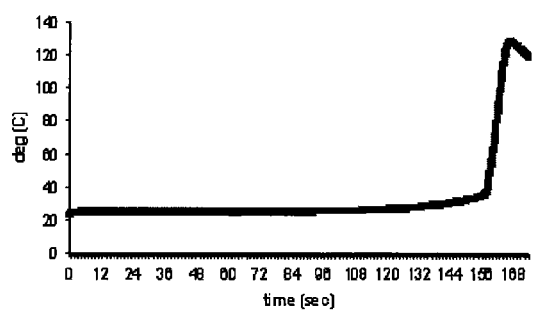
Figure 16: Cure time for adhesive using 23 (2-[(tert butylamino)thio]benzothiazole)
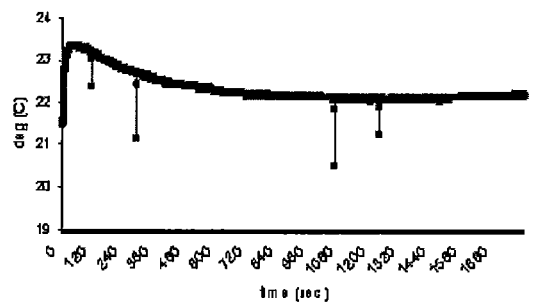
Figure 17: Cure time for adhesive 23 (2-[(tert butylamino)thio]benzothiazole), after UV exposure

ACTIVATORS FOR TWO PART CYANOACRYLATE ADHESIVES

FIELD OF THE INVENTION

The invention relates to the field of curable compositions such as adhesives for bonding materials, and more particularly to cyanoacrylate adhesives and improved compositions thereof. More particularly the invention relates to activators for such curable compositions and in particular to cyanoacrylate adhesive compositions.

DISCUSSION OF RELATED TECHNOLOGY

Curable compositions such as cyanoacrylate adhesives are well recognised at home and in industry for their excellent ability to rapidly bond a wide range of substrates, generally in a number of minutes and depending on the particular substrate, often in a number of seconds.

Cyanoacrylate products are very suitable for use as adhesives, particularly in the assembly of small, close fitting parts. Their universality derives partly from the fact that polymerisation of the monomer is initiated by nucleophiles found under normal atmospheric conditions on most surfaces. The initiation by surface chemistry means that sufficient initiating species are available when two surfaces are in close contact with a small layer of cyanoacrylate between the two surfaces. Under these conditions a strong bond is obtained in a short time. Thus in essence the cyanoacrylate often functions as an instant adhesive.

Conversely, if the two surfaces are not in close contact (the bonding area is described as having increased gap), or if atmospheric conditions are such that there is a low concentration of initiating species on the surface; there may be insufficient initiating species for the cyanoacrylate to function as an instant adhesive.

Thus, cyanoacrylate adhesive performance, bonding time and durability is dependent on the type of substrate and the presence or absence of contaminant material. Generally, performance is quite rapid for most substrates, however for substrates of acidic nature such as wood or paper, cure times can be significantly longer. These problems are overcome to an extent by the practice of using additional nucleophilic initiating moieties in conjunction with the cyanoacrylate monomers or the inclusion of an accelerator in the cyanoacrylate adhesive itself, in either instance to accelerate bond formation. The accelerator can be added to the adhesive composition directly, or as an alternative, they may be used directly on the substrate in a low boiling solvent prior to adhesive application as a surface primer or activator to supply activating molecules to the bond line. The activating species should not cause instant polymerisation (shock hardening) but should have some initial miscibility to give cure through volume. Activators/accelerators may be applied in one of two ways, (i) pre-activation where the activator is applied to one or both of the substrates prior to application of the adhesive; the low boiling point solvent is allowed to evaporate; leaving the activating species behind or (ii) post-activation where the activator is applied subsequent to the application to the adhesive (and commonly after assembly of the substrates). This is typically used to cure fillets of monomer outside the bond line.

Unfortunately, there are a number of disadvantages associated with the use of existing solvent based activators. It is frequently difficult to specify exactly the amount of activator used (particularly in manual operations) and overuse of activator component is associated with lower bond strength. Often, there is a solvent extraction/notification requirement associated with the use of low boiling point organic solvents in the workplace. Furthermore, activated polymerisation can result in opaque, whitened bond lines, and finally, many of the low boiling point solvents used can attack plastics. Occasionally, use of activator materials can lead to production of lower bond strengths or failure to form a bond, depending on the substrates used.

Accelerators suitable for use in adhesive application have also found use in vulcanisation of rubber applications.

Japanese Patent No. 1 328 480 of Sumitoko Chemical Company Limited reports that replacement of the cyclohexyl group of N-cyclohexyl benzothiazyl sulfenamide accelerators by alkyl groups of higher numbers of carbon atoms leads to considerably improved co-vulcanization of the mixtures of EPDM (ethylene propylene diene monomer) rubber.

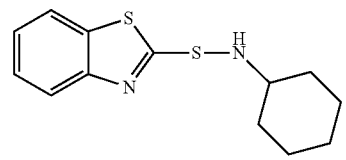

N-Cyclohexyl benzothiazyl sulfenamide

Great Britain Patent No. 1 420 409 of Universal Oil Products Company describes improved thiocarbamyl sulfenamide accelerators for use in the vulcanisation of rubber formulations. The improved compounds bear an optionally substituted aromatic substituent on the sulfenamide nitrogen atom. The compounds are said to be superior to known analogues and overcome the problems associated with earlier accelerator's instability in storage which leads to loss of crystallinity on handling, decreased accelerator efficiency and tendency to cure prematurely.

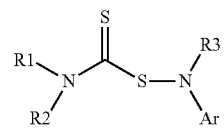

Substituted thiocarbamyl sulfenamides

International Publication No. WO 2008/035375 of National Organic Chemicals Industries describes use of accelerators comprising sulfenamide derivatives of 4-alkyl substituted 2-mercapto benzothiazoles for stabilisation and improved reversion resistance of vulcanizable rubber compositions.

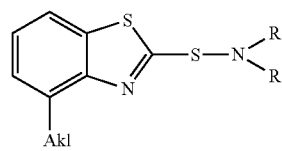

4-alkyl-2-Mercapto benzothiazoles sulfenamide

U.S. Pat. No. 1,455,941 of Monsanto Company describes using bis(sulfenamides) as primary vulcanisation accelerators which accelerate vulcanisation of rubber in the absence of conventional accelerators.

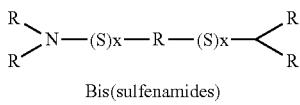

Bis(sulfenamides)

U.S. Pat. No. 4,665,155 provides vulcanisates such as trithiocarbonates that provide improved retention of optimum physical properties, which are used in conjunction with accelerators such as thioazole based accelerators. Benzothizole-2-sulphenamide accelerators were found to be particularly useful. Two part products comprising adhesive and activators are not mentioned.

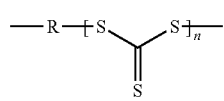

Polymeric trithiocarbonates

International Patent Publication No. WO 2008/007937 of Elastomer Technologies Ltd. teaches use of elastomer delinking accelerators including 2-mercaptobenzothiazole and derivatives thereof, in compositions useful for devulcanisation of elastomeric materials. The technology provides useful improvements to rubber recycling processes.

2-Mercaptobenzothiazole

Great Britain Patent No. 1,499,851 of American Cyanamid Company describes stabilized accelerator compositions for rubber, comprising particularly benzothiazole sulfenamide and a thiuram sulfide and a stabilizing compound.

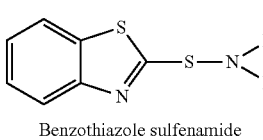 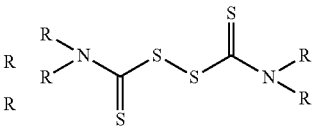

Benzothiazole sulfenamide   Thiuram sulfide

Great Britain Patent No. 1,414,317 of Loctite (Ireland) Limited describes cyanoacrylate adhesive accelerator/activator compounds having —N—C(-)=S or —N=C(-)—S— groups, but which do not contain Lewis acid groups, which are noted as tending to inhibit cure. The compounds as accelerator are added directly to the adhesive at the time of use, or are applied to at least one of the substrates prior to application of adhesive when used as activator. Examples of suitable activators in the GB '317 patent include certain N-disubstituted metallic dithiocarbamates, N-substituted benzothiazole-2-sulfenamides and N,N-tetrasubstituted thiuram mono- or oligosulfides.

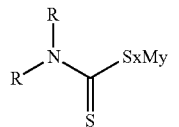 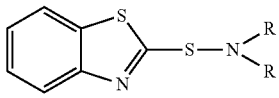

N-disubstituted metallic-Dithiocarbamates   N-substituted benzothiazole-2-sulfenamides

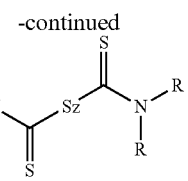

N,N-tetrasubstituted thiuram mono- or oligosulfides

European Patent No. EP 785 865 describes a non-environmentally hazardous and non-volatile adhesive promoter composition for promotion of adhesive cure comprising amongst others, tert-butyl benzothiazole sulfenamide and N-oxydiethylene benzothiazoles-2-sulfenamide, present in an amount of about 0.01% to about 10% by weight. The activators are provided in a high boiling point solvent, wherein the activator and adhesive formulation may be provided as two liquids and cure may be achieved by manual mixing or by co-extrusion through a static mixer. The method is useful, since it allows metered addition of activator. In particular, tert-butyl benzothiazole sulfenamide and N-oxydiethylene benzothiazole-2-sulfanamides have been used in this manner. High boiling point solvents compatible for use with cyanoacrylates are further described in International Patent Publication No. WO 02/053666.

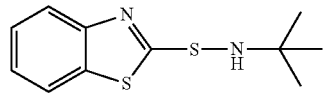

t-butyl benzothiazole sulfenamide

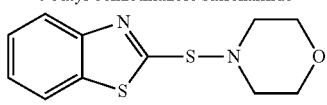

N-oxidiethylene benzothiazoles-2-sulfenamide

Japanese Patent Publication No. 62-022877 describes the use of aromatic amines as activators. The main associated advantage with use of these compounds being that there is no unpleasant odour and relevantly good efficient acceleration is provided, particularly when N,N-Dimethyl-p-Toluidine (DMPT) is used.

N,N-Dimethyl-p-Toluidine (DMPT)

U.S. Pat. No. 6,547,917 describes superior activator compounds for accelerating hardening having the structural element —N=C—S—S—C=N—. The compounds described such as dithiopyridine, N-t-butyl-2-benzothiazole-sulfenamide, N-cyclohexyl-2-benzothiazole-sulfenamide, dibenzothiazyl disulfide, promote hardening to occur within a few seconds. These compounds are superior since they allow a substantially longer waiting time between application of the activator and application of the adhesive and thus tend to avoid superficial hardening.

However, there are some limitations associated with the state of the art. For example, deactivation of some activators may occur when they are storage in clear packaging. Additional, it is doubtful that activators based on tert-butyl benzothiazole sulfenamide, N-oxydiethylene benzothiazole-2-sulfanamide or N,N dimethyl-p-toluidine have sufficient UV or hydrolytic stability to allow their use in clear two component packaging. Furthermore, the time between mixing and polymerisation for two component adhesives based on tert-butyl benzothiazole sulfenamide (European Patent No. EP 785,865) or N,N dimethyl-p-toluidine (Japanese Patent Application No. JP 62-022877) or 2,2 dithiodipyridine is typically in the range of 30 s-60 s. Such gel times may be insufficient where some assembly time is required, as would be the case for larger parts. A longer, reliable time between mixing and curing would be of advantage to an adhesive user and would allow mixing nozzles to be used for a longer time.

Thus, it is desirable to provide additional activators for cyanoacrylate compositions which are particularly suitable for use in two-part packs. In particular the provision of activators, which are more insensitive to UV and/or water are desirable for example for improved storage stability.

SUMMARY OF THE INVENTION

According to the present invention, there is provided a cyanoacrylate composition comprising:

a cyanoacrylate; and a 2-substituted benzothiazole or a derivative thereof wherein the 2-substituent is an alkyl, an alkene, an alkylbenzyl, an alkylamino, an alkoxy, an alkylhydroxy, an ether, a sulfenamide, a thioalkyl or a thioalkoxy group, with the proviso that an amide portion of the sulfenamide does not have a tert butylamino or a morpholine group.

Thus, the cyanoacrylate compositions of the invention include an activator (the 2-substituted benzothiazoles) that can assist with cure, in particular, with rapid adhesive bond formation.

Thus, certain of the compositions of the invention have the particular advantage that they are less prone to moisture and UV sensitivity. Certain of the activators of the invention are particularly useful for storage in transparent or translucent containers that may allow greater UV penetration than a comparable opaque container. Furthermore the compositions of the invention demonstrate good cure-through-gap properties.

The present invention thus provides improved activators for use in cyanoacrylate adhesive compositions and applications thereof. The invention provides such activators for use in two-part cyanoacrylate adhesive applications, which are less prone to deactivation than known activators and/or provide superior cure times.

The cyanoacrylate compositions of the invention comprise 2-substituted benzothiazoles as activators/accelerators. Suitably, the substitutions at the 2-position of the benzothiazole ring include $C_1$-$C_4$ alkyl groups such as methyl, ethyl, propyl or butyl groups. It will be appreciated that branched propyl or butyl substituents may be used to provide particularly desirable activators in cyanoacrylate compositions. Most desirable are 2-substituted benzothiazole compounds having a methyl substituent at the 2-position of the benzothiazole ring.

Suitable alkene substituents at the 2-position of the benzothiazole ring may be $C_1$-$C_4$ alkene groups such as an allyl, a propylene or a butylene groups. The alkene bond may be terminal to the 2-position of the benzothiazole ring or may be in an intermediate position along the hydrocarbon chain.

Other advantageous compositions arise, when the activator/accelerator compounds have alkylhydroxy substitutions at the 2-position of the benzothiazole ring. Suitably, the alkylhydroxy substituent may be a branched or unbranched $C_1$-$C_4$ alkylhydroxy group, wherein the alkyl chain is substituted with the hydroxyl group at any of the $C_1$-$C_4$ hydrocarbon positions.

Suitable ether substituents at the 2-position of the benzothiazole ring of the activators/accelerators for the compositions of the invention may comprise ether groups. Suitably, the ether substituent may be a branched or unbranched $C_1$-$C_{10}$ alkylether group, a branched or unbranched $C_1$-$C_{10}$ alkylether group containing at least one double bond or branched or unbranched $C_1$-$C_{10}$ alkylether group containing at least one triple bond, in the alkyl chain. Desirably, the ether group oxygen atom is directly linked to the benzothiazole at the 2-position.

Other favourable compositions result wherein the benzothiazole compounds have a sulfenamide positioned at the 2-position of the benzothiazole compounds. Suitable sulfenamide substituents include sulfenamide wherein the amide portion of the sulfenamide is a cyclohexylamine but exclude those having an amide portion which is a morpholine or a butylamino group.

The cyanoacrylate compositions of the invention may comprise benzothiazole compounds, which have a thioalkyl substituent at the 2-position of the benzothiazole. Desirably, the alkyl portion of the thioalkyl substituent may comprise a branched or unbranched $C_1$-$C_{20}$ alkyl group attached to the thioalkyl sulfur atom. The sulfur atom of the thioalkyl substituent is directly attached at the 2-position of the benzothiazole. Suitably, $C_1$-$C_4$ thioalkyl groups may also be used as the 2-position substituent on benzothiazole ring. Such groups include thiomethyl, thioethyl, thiopropyl or thiobutyl groups, all of which provide desirable compounds for use as activators in cyanoacrylate adhesive compositions. It will be appreciated that branched thiopropyl or thiobutyl substituents may be used. Most desirable are compounds having a thiomethyl substituent at the 2-position of the benzothiazole ring.

Alternatively, the cyanoacrylate compositions of the invention may comprise benzothiazole compounds which have an alkylbenzyl group at the 2-position of the benzothiazole. Suitably the alkylbenzyl group may comprise a branched or unbranched $C_1$-$C_4$ alkyl chain, which is further substituted with a benzyl group at any of the $C_1$-$C_4$ positions. Desirably, the compound has the benzyl group at the terminal carbon in the hydrocarbon chain.

Other desirable compound arise wherein the benzothiazole compound comprises a alkylamino substituent at the 2-position. Suitable alkylamino substituents include a branched or unbranched $C_1$-$C_4$ alkyl group, which is further substituted with at least one amine group at any one of the $C_1$-$C_4$ positions. The amine may be a primary amine (—$NH_2$) or a secondary amine (—$NHR^1$, wherein $R^1$ may be a $C_1$-$C_4$ alkyl group), or a combination thereof.

Suitably, the cyanoacrylate compositions of the invention may comprise benzothiazole compounds which comprise an alkoxy substituents at the 2-position of the benzothiazole ring. Desirably, $C_1$-$C_4$ alkoxy groups such as methoxy, ethoxy, propoxy or butoxy groups are the substituent. It will be appreciated that branched propoxy or butoxy substituents may be used.

Desirable activator/accelerators compounds of the invention include those having $C_1$-$C_4$ thioalkoxy groups at the 2-position of the benzothiazole. Suitably, thiomethoxyl, thioethoxy, thiopropoxy or thiobutoxy groups may be the favoured substituent. It will be appreciated that branched thiopropoxy or thiobutoxy substituents may be used.

Desirably, the benzene ring of any of the 2-substituted benzothiazole compounds of the invention may be substituted with at least one halo, thioalkyl, haloalkyl, ether, alkyl, alkoxy or hydroxyl substituent.

Suitably, the halo substituent on the benzene ring of the benzothiazole compound may be Cl, Br or F, or combinations thereof. Benzothiazole compounds having at least one Cl substituent on the benzene ring of the benzothiazole provides compounds which are particularly desirable as activators in cyanoacrylate compositions. Most desirable of all are compounds having Cl at the 5-position of the benzene ring of the benzothiazole compound. Particularly desired as such compounds where there is a methyl substituent at the 2-position of the benzothiazole compound.

Alternatively the benzene ring of the benzothiazole compounds may be substituted with at least one thioalkyl substituent. Desirably, the alkyl portion of the thioalkyl substituent may comprise a branched or unbranched $C_1$-$C_4$ alkyl group attached to the thioalkyl sulfur atom. The sulfur atom of the thioalkyl substituent is directly attached to the benzothiazole benzene ring. Such groups include thiomethyl, thioethyl, thiopropyl or thiobutyl groups at any of the positions of the benzothiazole benzene ring. It will be appreciated that branched thiopropyl or thiobutyl substituents may be used.

Alternative desirable compounds are benzothiazoles having a thiomethyl substituent on the benzothiazole benzene ring. In particular, it is desirable to have a thiomethyl substituent at the 5-position of the benzene ring of the benzothiazole compound. A particularly desirable compound has a thiomethyl substituent at the 5-position of the benzene ring of the benzothiazole compound and is substituted at the 2-position of the benzothiazole ring with a methyl group.

In compounds wherein there is provided a haloalkyl substituent on the benzene ring of the 2-substituted benzothiazole, it is desirable that such a haloalkyl substituent is a trifluoromethane group.

Other favourable compounds for use in the composition of the invention include 2-substituted benzothiazoles, which comprise ether substituents on the benzene ring of the benzothiazole compound. Suitable substituents comprise ether groups wherein the ether substituent is a branched or unbranched $C_1$-$C_{10}$ alkylether group, a branched or unbranched $C_1$-$C_{10}$ alkylether group containing at least one double bond or branched or unbranched $C_1$-$C_{10}$ alkylether group containing at least one triple bond in the alkyl chain. Desirably, the ether group oxygen atom is a methylether group on the benzene ring of the benzothiazole compound. Particularly preferred are such compounds where the methylether group is at the 4-position of the benzene ring of the benzothiazole compound.

Suitably, the compounds of the invention may have at least one alkyl substituent on the benzene ring of the benzothiazole compound. Suitable alkyl substituents include $C_1$-$C_4$ alkyl groups such as methyl, ethyl, propyl or butyl groups. It will be appreciated that branched propyl or butyl substituents may be used to provide particularly desirable as activators in cyanoacrylate compositions. Most desirable are compounds having at least one methyl substituent on the 5-, 6- or 7-position of the benzothiazole benzene ring. The most desirable compounds have at least one methyl substituent on the 5-, 6- or 7-position of the benzothiazole benzene ring and a methyl group at the 2-position of the benzotriazole compound.

Other desirable compounds of the invention are 2-substituted benzothiazoles having at least one alkoxy substituent on the benzene ring of the benzothiazole ring. Suitably, such alkoxy groups include $C_1$-$C_4$ alkoxy groups such as methoxy, ethoxy, propoxy or butoxy groups. It will be appreciated that branched propoxy or butoxy substituents may be used as the substituent. A methoxy substituent on the aromatic of the benzothiazole provide particularly desirable compounds for use as activators in cyanoacrylate compositions. It is particularly desirable to have such methoxy substituents at the 5- and 6-positions of the benzothiazole compound. The most desirable compounds have are 2-methyl benzothiazole compounds having methoxy groups in the 5- or 6-positions of the benzothiazole benzene ring.

Suitably the benzene ring of the benzothiazole compound may be substituted with at least one hydroxyl group to provide desirable compounds for use as activators in cyanoacrylate compositions. Particularly advantageous compounds arise wherein a 2-methyl benzothiazole compound is substituted with a hydroxyl group. Most favoured is a 2-methyl benzothiazole compound, which is substituted with a hydroxyl group at the 5-position.

The compounds of the invention are particular useful as activators for cyanoacrylate adhesive compositions. The compounds of the invention provide a good range of gel times while being less prone to moisture sensitivity and/or ultraviolet ageing. An advantage therefore is that the cyanoacrylate compositions of the invention, comprising the compounds of the invention may be packed in clear, UV transparent or opaque packaging since ultraviolet light sensitivity is reduced. It may be possible that the compositions of the invention may have a longer shelf life.

The 2-substituted benzothiazoles or derivatives thereof of the invention may be selected from:

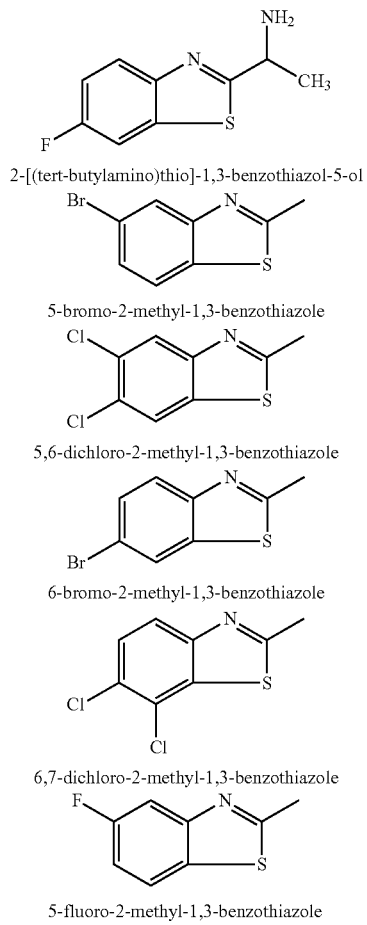

-continued

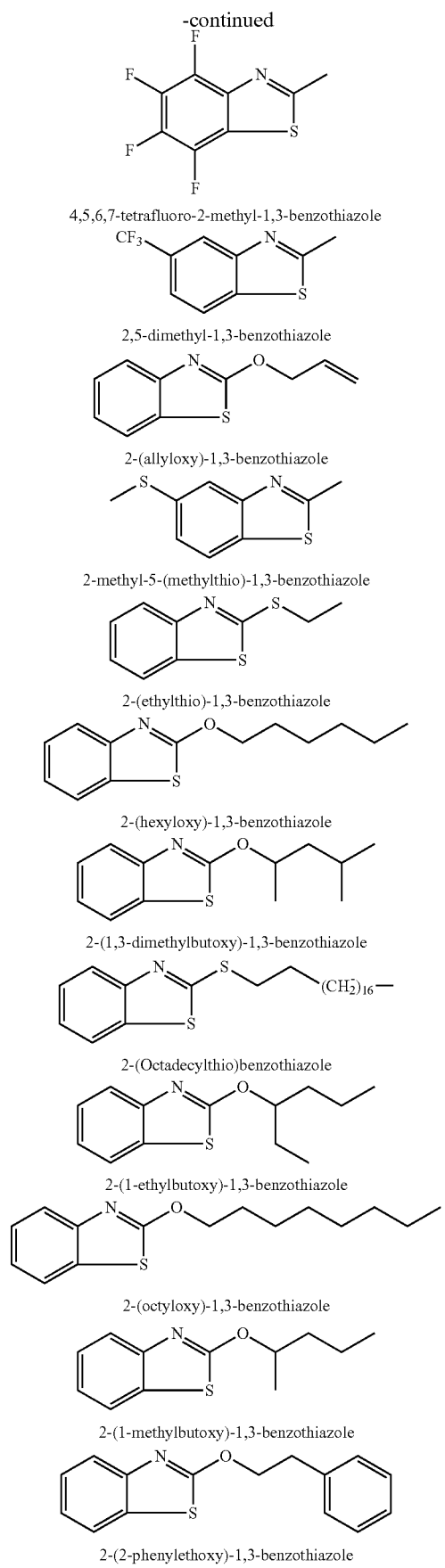

4,5,6,7-tetrafluoro-2-methyl-1,3-benzothiazole 2,5-dimethyl-1,3-benzothiazole 2-(allyloxy)-1,3-benzothiazole 2-methyl-5-(methylthio)-1,3-benzothiazole 2-(ethylthio)-1,3-benzothiazole 2-(hexyloxy)-1,3-benzothiazole 2-(1,3-dimethylbutoxy)-1,3-benzothiazole 2-(Octadecylthio)benzothiazole 2-(1-ethylbutoxy)-1,3-benzothiazole 2-(octyloxy)-1,3-benzothiazole 2-(1-methylbutoxy)-1,3-benzothiazole 2-(2-phenylethoxy)-1,3-benzothiazole -continued

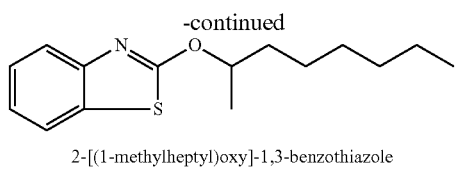

2-[(1-methylheptyl)oxy]-1,3-benzothiazole

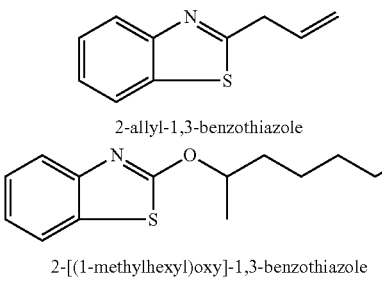

2-allyl-1,3-benzothiazole

2-[(1-methylhexyl)oxy]-1,3-benzothiazole

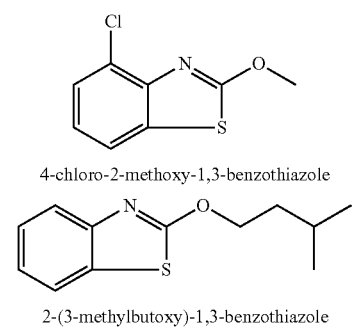

4-chloro-2-methoxy-1,3-benzothiazole 2-(3-methylbutoxy)-1,3-benzothiazole

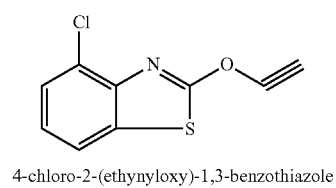

4-chloro-2-(ethynyloxy)-1,3-benzothiazole 2,5,6-trimethyl-1,3-benzothiazole

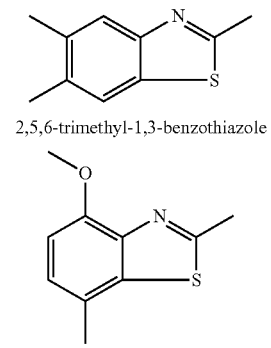

4-methoxy-2,7-dimethyl-1,3-benzothiazole

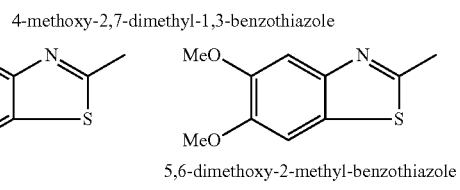

2,5,7-trimethyl-1,3-benzothiazole    5,6-dimethoxy-2-methyl-benzothiazole

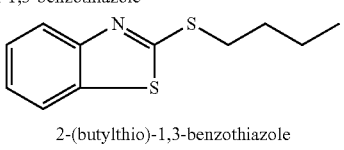

2-(butylthio)-1,3-benzothiazole

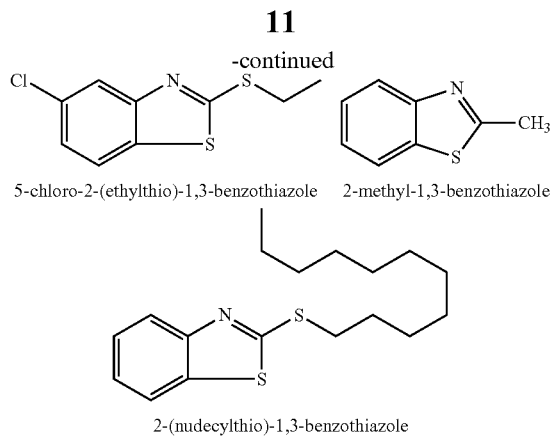

5-chloro-2-(ethylthio)-1,3-benzothiazole    2-methyl-1,3-benzothiazole 2-(nudecylthio)-1,3-benzothiazole Particularly desirable cyanoacrylate compositions of the invention comprise activators based on 2-substituted benzothiazoles or derivatives thereof, which may be selected from:

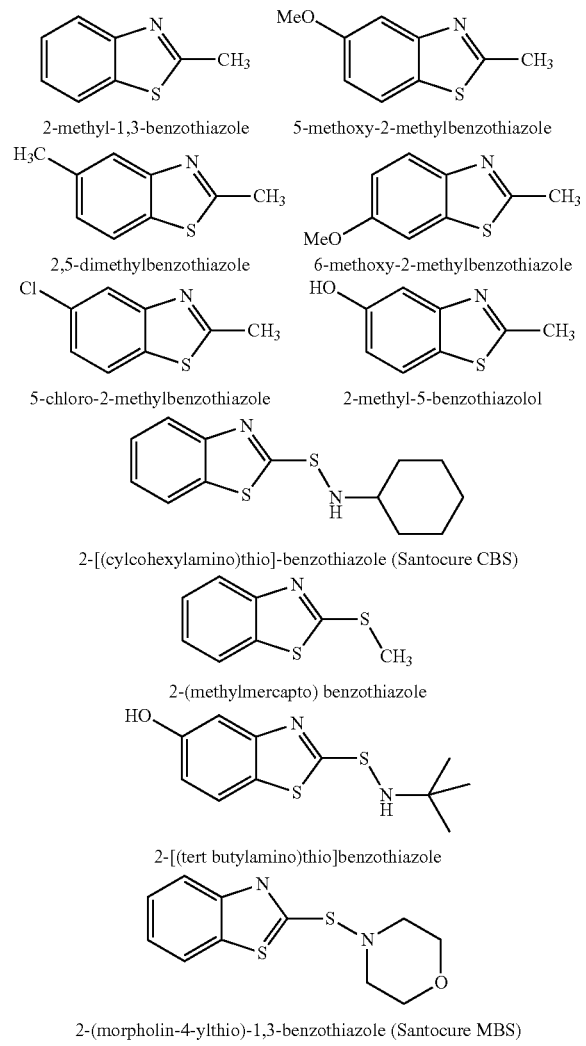

2-methyl-1,3-benzothiazole    5-methoxy-2-methylbenzothiazole 2,5-dimethylbenzothiazole    6-methoxy-2-methylbenzothiazole 5-chloro-2-methylbenzothiazole    2-methyl-5-benzothiazolol 2-[(cylcohexylamino)thio]-benzothiazole (Santocure CBS)

2-(methylmercapto) benzothiazole

2-[(tert butylamino)thio]benzothiazole 2-(morpholin-4-ylthio)-1,3-benzothiazole (Santocure MBS)

Other desirable compositions of the invention comprise activators based on 2-substituted benzothiazoles or derivatives thereof, and may be selected from:

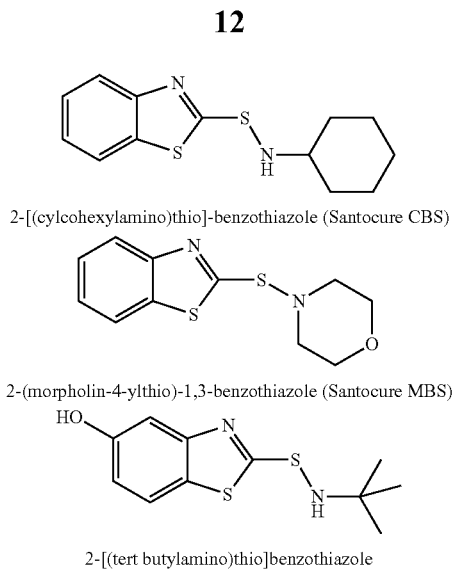

2-[(cylcohexylamino)thio]-benzothiazole (Santocure CBS)

2-(morpholin-4-ylthio)-1,3-benzothiazole (Santocure MBS)

2-[(tert butylamino)thio]benzothiazole

Compositions comprising these particular activators have been found to be sensitive to environmental degradation, such as UV ageing. Thus, it is desirable to maintain compositions of these activators in packaging that is resistant to environmental contaminants. For instance, it is desirable to provide those in packaging that has UV blocking properties. That is, the pack should be sufficiently opaque to UV light so as to prevent any substantial deterioration of the ability of the activator to activate a cyanoacrylate composition. This is useful as it is desirable that the activator does not deteriorate significantly over time and maintains the ability to activate substantially well. For two-part compositions it is desirable that at least the activator part of the composition is retained in a UV opaque container.

Particularly desired cyanoacrylate compositions of the invention comprise activators based on 2-substituted benzothiazoles or derivatives thereof, which may be selected from:

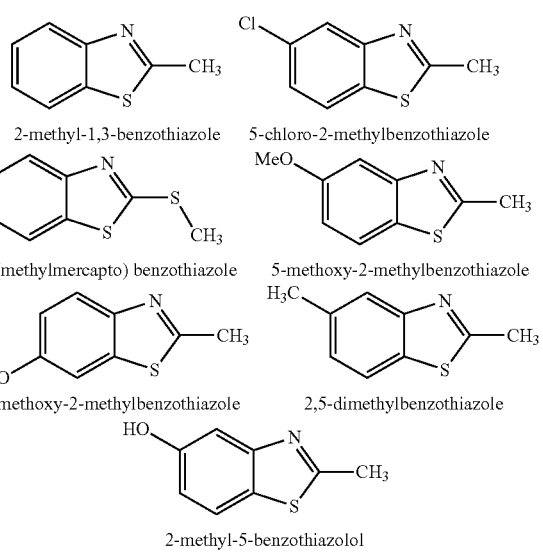

2-methyl-1,3-benzothiazole    5-chloro-2-methylbenzothiazole 2-(methylmercapto) benzothiazole    5-methoxy-2-methylbenzothiazole 6-methoxy-2-methylbenzothiazole    2,5-dimethylbenzothiazole 2-methyl-5-benzothiazolol These activators are particularly useful in the compositions of the invention, since compositions comprising these compounds as activators are still curable after exposure to accelerated ageing by exposure to UV light. Thus cyanoacrylate adhesive compositions comprising these compounds may be packaged in regular UV transparent packaging, which is not required to be UV blocking. Thus, the invention provides improved activators, which are particularly resistant to the effects of UV exposure and/or ageing, and will still function sufficiently well to provide a sufficient cure, after the effects of UV exposure and/or ageing. The invention provides improved activators that are not so moisture sensitive as prior art activators and which still functional well after storage, where there may be some ingress of moisture into a storage container. Compositions of the invention may contain such activators, which may be selected from:

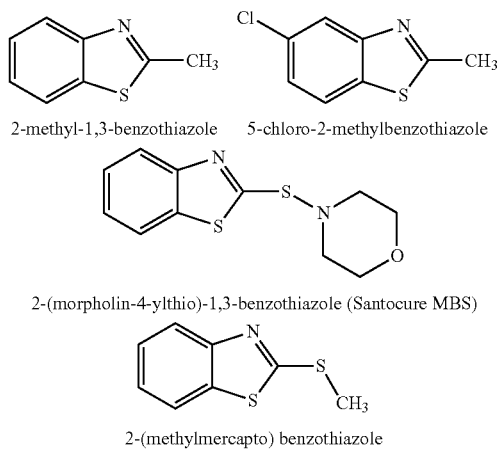

In general, the 2-substituted benzothiazole is carried by a carrier component. Thus the 2-substituted benzothiazole is present with, or may be supplied with, a suitable carrier. Suitably, the carrier component may be comprise a plasticizer selected from triacetin, dioctyl phthalate, dibutyl phthalate, trioctyl trimellitate, dioctyl adipate, dioctyl glutarate, butyl cyanoacetate, trimethyl trimellitate, diethylene glycol dibenzoate, diethyl malonate, triethyl-O-acetyl citrate, benzylbutyl phthalate, dipropylene glycol dibenzoate, diethyl adipate, tributyl-O-acetyl citrate, dimethyl sebacate, tributyl-O-acetyl citrate (TBAC), triethyl-O-acetyl citrate (TEAC), dipropylene glycol dibenzoate (DPGDB), diethylene glycol, dibenzoate (DEGBD), benzylbutyl phthalate, dibutyl adipate, dibutyl sebacate, dicapryl adipate, dicapryl phthalate, diethyleneglycol dibenzoate, diethyl adipate, diethyl glutarate, diethyl malonate, diethyl pimelate, diisononyl phthalate, dimethyl adipate, dimethyl glutarate, dimethyl sebacate, dioctyl phthalate, diprophyleneglycol dibenzoate, ethyl caproate, glyceroltrioleate, isopropyl myristate, methyl laurate, methyl stearate, pentaerythritol tetraacrylate, pentaerythriotoltetrabenzoate, poly(neopentyl glycoladipate), tributyl-O-acetyl citrate, tricapryl trimellithate, triethyl-O-acetyl cityrate, trihexyl trimellithate, tris(isopropyl phenyl) phosphate, trimethyl trimellithate, trioctyl trimellithate, organic ethers, in particular aryl or diaryl ethers, where the aromatic ring of each aryl group is directly bonded to the ethereal oxygen and monocyclic or bicyclic lactones having from 3 to 20 carbon atoms and having from 4 to 7 members in the lactone ring.

When packaged in a dual barrel syringe with one chamber of the syringe having a 9 ml capacity and the other a 1 ml capacity, the cyanoacrylate compositions according to the invention generally can achieve a cure through gap when applied to or between two substrates of between 0.5 mm and 2 mm, while acting as a so-called "instant adhesive".

Desirably, the cyanoacrylate compositions of the invention may have a cure time of in some cases less than 10 seconds, and in others between 30 seconds and 300 seconds. Such composition may comprise the following 2-substituted benzothiazole compounds or combinations of compounds as accelerator/activator:

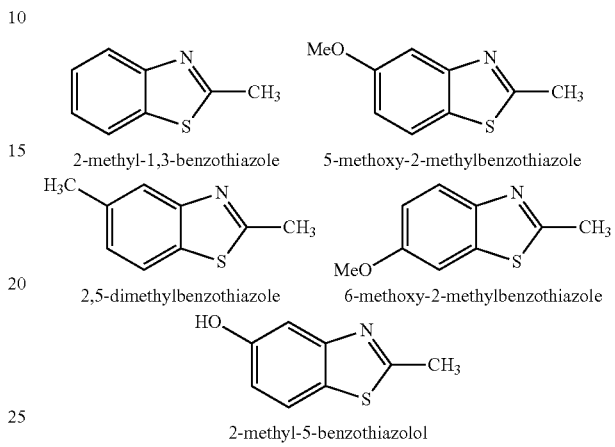

In another aspect of the invention there is provided for the use of a 2-substituted benzothiazole as a cyanoacrylate adhesive activator and/or accelerator, wherein the 2-substituent is an alkyl, an alkene, an alkylbenzyl, an alkylamino, an alkoxy, an alkylhydroxy, an ether, a sulfenamide, a thioalkyl or a thioalkoxy group, as defined above.

Suitably, the benzene ring of the 2-substituted benzothiazole may be further substituted with at least one halo, thioalkyl, haloalkyl, alkyl, alkoxy or hydroxyl substituent as defined above.

The invention desirably provides a pack comprising a cyanoacrylate adhesive composition comprising
a cyanoacrylate; and
a 2-substituted benzothiazole or a derivative thereof
wherein the 2-substituent is an alkyl, an alkene, an alkylbenzyl, an alkylamino, an alkoxy, an alkylhydroxy, an ether, a sulfenamide, a thioalkyl or a thioalkoxy group, with the proviso that an amide portion of the sulfenamide is not a tert butylamino or a morpholine group. This pack may be constructed from a UV transparent material or a UV blocking material.

In a different aspect the invention provides a pack comprising a cyanoacrylate adhesive composition comprising:
a cyanoacrylate; and
a 2-substituted benzothiazole or a derivative thereof
wherein the 2-substituent is an alkyl, an alkene, an alkylbenzyl, an alkylamino, an alkoxy, an alkylhydroxy, an ether, a sulfenamide, a thioalkyl or a thioalkoxy group. Here, in order to promote an extended shelf life one may wish to choose a pack that comprises a UV opaque material or is constructed from a UV blocking material.

In yet a related aspect, the invention provides a pack comprising an cyanoacrylate adhesive composition comprising:
a cyanoacrylate; and
a 2-substituted benzothiazole or a derivative thereof
wherein the 2-substituent is a sulfenamide wherein the amide portion is a tert-butylamino, or a morpholine group. Again, here, in order to promote an extended shelf life the pack should be constructed from a UV blocking material.

In the aspects relating to packs, the 2-substituted benzothiazole may comprise a 2-substituent which may be alkyl, an alkene, an alkylbenzyl, an alkylamino, an alkoxy, an alkylhydroxy, an ether, a sulfenamide, a thioalkyl or a thioalkoxy groups, as defined above. Suitably, the benzene ring of the 2-substituted benzothiazole may be further substituted with at least one halo, thioalkyl, haloalkyl, alkyl, alkoxy or hydroxyl substituent as defined above.

In one desirable arrangement, the cyanoacrylate composition of the invention is provided in a two-part form. Suitably, the cyanoacrylate composition is packed in a dispensing pack. For two-part compositions this may be a pack that co-dispenses the two-parts (suitably in desired ratios) for mixing thereof. For example such a dispensing pack may be a dual barrel syringe. For example the cyanoacrylate adhesive composition may be held in a first compartment such as the barrel of a syringe, whereas the activator component is held in a second compartment for example a separate barrel of a syringe. It will be appreciated that any suitable dispensing pack may be used. In an additional aspect, the invention provides an activator for use in activating a cyanoacrylate composition, which is selected from a 2-substituted benzothiazole or a derivative thereof, wherein the 2-substituent is an alkyl, an alkene, an alkylbenzyl, an alkylamino, an alkoxy, an alkylhydroxy, an ether, a sulfenamide, a thioalkyl or a thioalkoxy group, with the proviso that the sulfenamide is any sulfenamide other than a sulfenamide having an amide portion comprising a tert butylamino or a morpholine group.

In another additional aspect, the invention provides a method of using a 2-substituted benzothiazole or a derivative thereof as an activator for use in activating a cyanoacrylate composition, steps of which comprise in any order:

providing an activator comprising a 2-substituted benzothiazole or a derivative thereof, and providing a cyanoacrylate, wherein the 2-substituent is an alkyl, an alkene, an alkylbenzyl, an alkylamino, an alkoxy, an alkylhydroxy, an ether, a sulfenamide, a thioalkyl or a thioalkoxy group, with the proviso that the sulfenamide is any sulfenamide other than a sulfenamide having an amide portion that is made from a tert butylamino or a morpholine group.

BRIEF DESCRIPTION OF THE DRAWINGS

FIG. 1: Bond Strengths for Two-Part CA's—part B;

FIG. 2: Cure time for adhesive using Composition comprising compound 2 (2-Me BT) as activator;

FIG. 3: Cure time for adhesive using Composition comprising compound 2 (2-MeBT) as activator, after UV exposure;

FIG. 4: Cure time for adhesive using Composition comprising compound 8 (5-Cl-2-Me-BT) as activator;

FIG. 5: Cure time for adhesive using Composition comprising compound 8 (5-Cl-2-Me-BT) as activator, after UV exposure;

FIG. 6: Cure time for adhesive using Composition comprising compound 9 (2-Me-mercapto BT) as activator;

FIG. 7: Cure time for adhesive using Composition comprising compound 9 2-Me-mercapto BT) as activator, after UV exposure;

FIG. 8: Cure time for adhesive using Composition comprising compound 10 (Santocure MBS) as activator;

FIG. 9: Cure time for adhesive using Composition comprising compound 10 (Santocure MBS) as activator, after UV exposure;

FIG. 10: Cure time for adhesive using Composition comprising compound 12 (Santocure CBS) as activator;

FIG. 11: Cure time for adhesive using Composition comprising compound 12 (Santocure CBS) as activator, after UV exposure;

FIG. 12: Cure time for adhesive using Composition comprising compound 14 (DMPT) as activator;

FIG. 13: Cure time for adhesive using Composition comprising compound 14 (DMPT) as activator, after UV exposure;

FIG. 14: Cure time for adhesive using Composition comprising compound 15 (2,2-Dithiodipyridine) as activator;

FIG. 15: Cure time for adhesive using Composition comprising compound 15 (2,2-Dithiodipyridine) as activator, after UV exposure FIG. 16: Cure time for adhesive using Composition comprising compound 23 (2-[(tert butylamino)thio]benzothiazole as activator;

FIG. 17: Cure time for adhesive using Composition comprising compound 23 (2-[(tert butylamino)thio]benzothiazole as activator, after UV exposure.

DETAILED DESCRIPTION OF THE INVENTION

As an investigation into activator deactivation, the Inventors tested a two-part product containing cyanoacrylate based "A Part" (LOCTITE 431) and activator based "B Part" which comprised N-tert-butyl-2-benzothiazole sulfenamide and triacetin as a control (all Loctite products are available from Henkel Ireland Limited, Tallaght, Dublin 24). It was observed that gel times drifted on some unique samples stored at room temperature (RT) and this was particularly noticeable on samples provided in clear packaging. It appeared that UV exposure resulted in deterioration of the adhesive cure properties.

Further investigation showed that for the samples for which gel time increased, the active N-tert-butyl-2-benzothiazole sulfenamide activator concentration was significantly decreased from the initial value. The initial activator component concentration was 0.0455M. The reduction in cure performance and concentration of activator would seem to indicate that loss of activator detrimentally affects the adhesive cure performance.

The aim was to find replacement activators for N-tert-butyl-2-benzothiazole sulfenamide that would provide for better cure times and/or activators which will not be UV or water sensitive.

Thus, the activator "B Part" was substituted with individual compounds as shown in Table 1 and mixed with triacetin before mixing with "A Part".

Compounds investigated as possible activators are shown in Table 1.

TABLE 1

Compounds Investigated

Activator

| 1 | 2-chloro-1,3-benzothiazole |
|---|---|

TABLE 1-continued

Compounds Investigated

Activator

| # | Compound | Name |
|---|---|---|
| 2 | 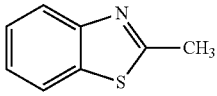 | 2-methyl-1,3-benzothiazole |
| 3 | 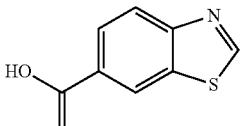 | 1,3-benzothiazole-6-carboxylic acid |
| 4 | 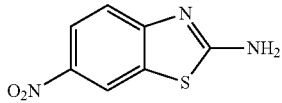 | 2-amino-6-nitro-benzothiazole |
| 5 | 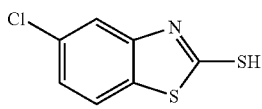 | 5-chloro-2-mercapto-benzothiazole |
| 6 | 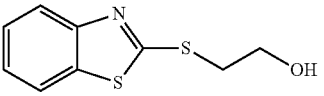 | 2(2-benzothiazolylthio)ethanol |
| 7 | 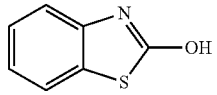 | 2-hydroxybenzothiazole |
| 8 | 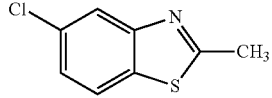 | 5-chloro-2-methylbenzothiazole |
| 9 | 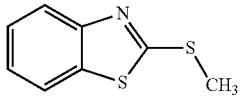 | 2-(methylmercapto)benzothiazole |
| 10 | 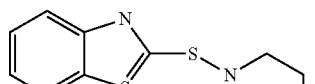 | 2-(morpholin-4-ylthio)-1,3-benzothiazole (Santocure MBS) |
| 11 | 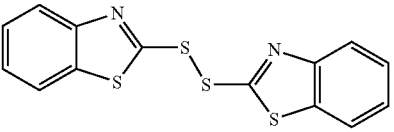 | mercaptobenzothiazyl disulfide (Perkacit MBTS) |
| 12 | 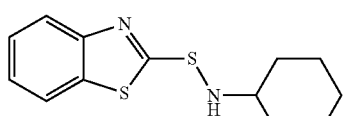 | 2-[(cyclohexylamino)thio]-benzothiazole (Santocure CBS) |
| 13 | 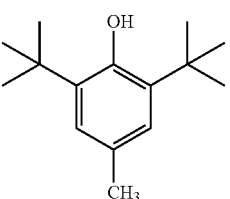 | 2,6-di-tert-butyl-4-methylphenol |
| 14 | 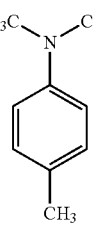 | N,N,4-trimethylaniline (DMPT) |
| 15 | 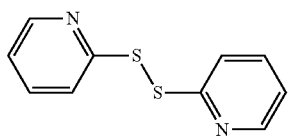 | 2,2-Dithiodipyridine |
| 16 | 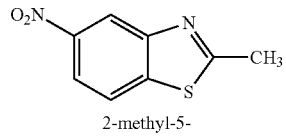 | 2-methyl-5-nitrobenzothiazole |
| 17 | 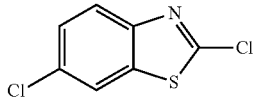 | 2,6-dichlorobenzothiazole |
| 18 |  | 5-methoxy-2-methylbenzothiazole |

TABLE 1-continued

Compounds Investigated

Activator

| | | |
|---|---|---|
| 19 | 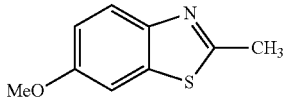 6-methoxy-2-methylbenzothiazole | |
| 20 | 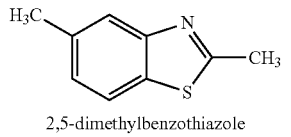 2,5-dimethylbenzothiazole | |
| 21 | 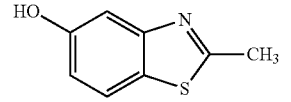 2-methyl-5-benzothiazolol | |
| 22 | 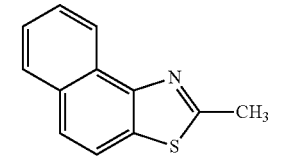 2-methyl-beta-napthothiazole | |
| 23 | 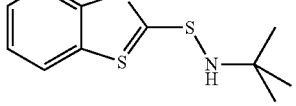 2-[(tert butylamino)thio] benzothiazole | |

These samples were evaluated with 2 part syringes (10:1, A:B) being packed as follows:

Part A: LOCTITE 431 (a medium viscosity cyanoacrylate);
Part B: Triacetin (99.89%) and activator (0.1098%), which were stirred together at RT for 30 minutes.

All evaluated activators were soluble in triacetin and gave clear solutions with the exception of 2-amino-6-nitro benzothiazole (4) and 2-methyl-β-napthothiazole (22), each of which were yellow in solution at the concentration used.

Samples were evaluated in terms of gel times. Gel times were measured by dispensing 1 g of material into a dish using a static mixer (containing 16 elements) and using a stopwatch to record the time taken for the material to cure. If curing had not occurred within 5 minutes, the material was given a gentle stir using an applicator stick. The tests were repeated to ensure reproducibility. Results of the adhesive testing are provided in Table 2 which provides details of the gel times for the compositions comprising the individual activator compounds tested. Composition which did not cure within 20 minutes of mixing have been denoted "DNC" which means they did not cure and were not subjected to further testing.

TABLE 2

Gel times for 2-part CA's

| | Activator (Part B) | Appearance as cures | Gel time 1 | Gel time 2 |
|---|---|---|---|---|
| 1 | 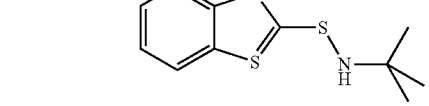 2-chloro-1,3-benzothiazole | >20 mins <24 hrs DNC | >20 mins <24 hrs DNC | |
| 2 | 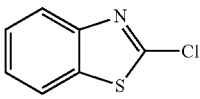 2-methyl-1,3-benzothiazole (2-Me BT) | Heat + fumes | 30 secs | 30 secs |
| 3 | 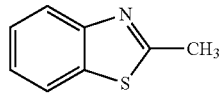 1,3-benzothiazole-6-carboxylic acid | >20 mins <24 hrs Sticky DNC | >20 mins <24 hrs Sticky DNC | |

TABLE 2-continued

Gel times for 2-part CA's

| | Activator (Part B) | Appearance as cures | Gel time 1 | Gel time 2 |
|---|---|---|---|---|
| 4 | 2-amino-6-nitro-benzothiazole | >20 mins <24 hrs Sticky DNC | >20 mins <24 hrs Sticky DNC | |
| 5 | 5-chloro-2-mercapto-benzothiazole | >20 mins <24 hrs DNC | >20 mins <24 hrs DNC | |
| 6 | 2(2-benzothiazolylthio)ethanol | >20 mins <18 hrs sticky DNC | >20 mins <18 hrs DNC | |
| 7 | 2-hydroxybenzothiazole | >20 mins <24 hrs DNC | >20 mins <24 hrs DNC | |
| 8 | 5-chloro-2-methylbenzothiazole (5-Cl-2-MeBT) | Heat, no fumes | 7 mins 30 sec-8 mins | 7 mins 30 sec-8 mins |
| 9 | 2-(methylmercapto)benzothiazole (2-Me-mercapto BT) | Heat, no fumes | 12-13 mins | 10 mins 45 sec-11 mins 15 sec |
| 10 | 2-(morpholin-4-ylthio)-1,3-benzothiazole (Santocure MBS) | Heat, no fumes | 8 mins 20 sec-9 mins | 8 mins 35 sec-9 mins 10 sec |
| 11 | mercaptobenzothiazyl disulfide (Perkacit MBTS) | >20 mins <18 hrs DNC | >20 mins <18 hrs DNC | |

TABLE 2-continued

Gel times for 2-part CA's

| | Activator (Part B) | Appearance as cures | Gel time 1 | Gel time 2 |
|---|---|---|---|---|
| 12 | 2-[(cyclohexylamino)thio]-benzothiazole (Santocure CBS) | Heat + fumes | 2 mins 30 sec– 2 mins 45 sec | Times varied from: 1 min 30 sec–min 1 min 45 sec–min 20 2 min 20 sec–min 40 |
| 13 | 2,6-di-tert-butyl-4-methylphenol | >20 mins <24 hrs DNC | >20 mins <24 hrs DNC | |
| 14 | N,N,4-trimethylaniline (DMPT) | Heat + fumes | 45-60 secs | 45-60 secs |
| 15 | 2,2-Dithiodipyridine | Heat, no fumes | 30-40 secs | 40-55 secs |
| 16 | 2-methyl-5-nitrobenzothiazole | >20 mins <24 hrs DNC | >20 mins <24 hrs DNC | |
| 17 | 2,6-dichlorobenzothiazole | >20 mins <24 hrs DNC | >20 mins <24 hrs DNC | |
| 18 | 5-methoxy-2-methylbenzothiazole | Heat + fumes | <10 sec | <10 sec |
| 19 | 6-methoxy-2-methylbenzothiazole | Heat + fumes | 10-12 sec | <10 sec |

TABLE 2-continued

Gel times for 2-part CA's

| | Activator (Part B) | Appearance as cures | Gel time 1 | Gel time 2 |
|---|---|---|---|---|
| 20 | 2,6-dimethylbenzothiazole | Heat + fumes | <10 sec | <10 sec |
| 21 | 2-methyl-5-benzothiazolol | Heat + fumes | Immediately as dispensed | <10 sec |
| 22 | 2-methyl-beta-napthothiazole | >20 mins <24 hrs DNC | >20 mins <24 hrs DNC | |
| 23 | 2-[(tert butylamino)thio] benzothiazole (Control) | Heat + fumes | 2 mins 30 secs-3 mins | 2 mins 20 secs-3 mins |

DNC = does not cure

From the results in Table 2, the compositions with the following activators produced suitable gel times.

| | Activator (Part B) |
|---|---|
| 2 | 2-methyl-1,3-benzothiazole (2-Me BT) |
| 8 | 5-chloro-2-methylbenzothiazole (5-Cl-2-MeBT) |
| 9 | 2-(methylmercapto) benzothiazole (2-Me-mercapto BT) |
| 10 | 2-(morpholin-4-ylthio)-1,3-benzothiazole (Santocure MBS) |
| 12 | 2-[(cyclohexylamino)thio]-benzothiazole (Santocure CBS) |
| 14 | N,N,4-trimethylaniline (DMPT) |
| 15 | 2,2-Dithiodipyridine |
| 18 | 5-methoxy-2-methylbenzothiazole |
| 19 | 6-methoxy-2-methylbenzothiazole |
| 20 | 2,5-dimethylbenzothiazole |
| 21 | 2-methyl-5-benzothiazolol |
| 23 | 2-[(tert butylamino)thio]benzothiazole (Control) |

Fixture Time Testing

Fixture times testing was then carried out on a variety of substrates (mild steel, aluminium, PVC and PC), using a number of compositions comprising activators which produced a good initial gel time result. The results of the Fixture Time Testing are presented in Table 3. Fixture speed is the time from joining the 2 substrates (each of which have a width of 1 inch and are aligned together with 0.5 inch overlap) sufficient to hold a 3 kg weight. All fixture time tests were carried out at room temperature. Isopropyl alcohol (IPA) was used to wipe the test substrate prior to activator application.

TABLE 3

Fixture Times for Two-Part CA's on Various Substrates

| Compound | MS(sec) | AI(sec) | PVC(sec) | PC(sec) |
|---|---|---|---|---|
| 2: 2-Me BT | 10-20 | <10 | 60-75 | 10-20 |
| 8: 5-Cl-2-MeBT | 90-120 | 30-45 | 90-105 | 45-60 |
| 9: 2-Me-mercapto BT | 150-180 | 45-60 | 60-90 | 30-45 |
| 10: Santocure MBS | 60-90 | 30-45 | 45-60 | 30-45 |
| 12: Santocure CBS | 30-60 | 20-30 | 20-30 | 45-60 |
| 14: DMPT | 20-30 | 20-30 | 20-30 | 45-60 |
| 15: 2,2-dithiodipyridine | 30-60 | 20-30 | 20-30 | 30-45 |
| 23: 2-[(tert butylamino)thio]benzothiazole Control | <10 | <10 | 60-75 | 30-45 |

Accelerated Aging and Fixture Testing Times

To mimic accelerated aging, the samples were exposed to UV light for 7 days and gel times were recorded again as described previously. The result can be seen below and in Table 4.

TABLE 4

| | Activator (Part B) | Gel time (after UV exposure) |
|---|---|---|
| 2 | 2-methyl-1,3-benzothiazole (2-Me BT) | 15-30 secs |
| 8 | 5-chloro-2-methylbenzothiazole (5-Cl-2-MeBT) | 6 mins 30 sec-7 mins 15 sec |

TABLE 4-continued

| | Activator (Part B) | Gel time (after UV exposure) |
|---|---|---|
| 9 | 2-(methylmercapto) benzothiazole (2-Me-mercapto BT) | 11 mins 45 sec-13 mins 15 sec |
| 15 | 2,2-Dithiodipyridine | 75-90 sec |
| 18 | 5-methoxy-2-methylbenzothiazole | <10 sec |
| 19 | 6-methoxy-2-methylbenzothiazole | <10 sec |
| 20 | 2,5-dimethylbenzothiazole | <10 sec |
| 21 | 2-methyl-5-benzothiazolol | <10 sec |

It can be seen that cure times were not adversely affected after UV ageing. The remaining composition comprising the following activators are suitable for use in UV blocking pack.

| | Activator (Part B) |
|---|---|
| 10 | 2-(morpholin-4-ylthio)-1,3-benzothiazole (Santocure MBS) |
| 12 | 2-[(cyclohexylamino)thio]-benzothiazole (Santocure CBS) |
| 14 | N,N,4-trimethylaniline (DMPT) |
| 23 | 2-[(tert butylamino)thio]benzothiazole (Control) |

Thermocouple Testing

Gel times were also carried out using a thermocouple. Approximately 0.6 g of each material was used. 0.6 g of material was dispensed through a static mixer into a test-tube (12×75 mm pyrex) and a thermocouple then inserted into the test-tube. Temperature increase from insertion of the thermocouple over time is recorded. The samples were tested before and after UV exposure for 7 days. The results can be seen in FIGS. 2 to 17.

Good correlation was obtained between the gel times observed with hand-mixing and those recorded using a thermocouple. Approximately 15 seconds must be allowed between weighing the samples and recording the response for the instrument set-up. It can be seen that a number of the samples did not survive the UV aging including Santocure MBS, Santocure CBS, DMPT and the control sample. The samples were also examined for changes in appearance after UV exposure (Table 5).

TABLE 5

Appearance of activator after UV exposure

| Compound No | Activator | Appearance of activator |
|---|---|---|
| 2 | 2-methylbenzothiazole | Activator clear |
| 8 | 5-chloro-2-methylbenzothiazole | Slight yellow tinge |
| 9 | 2-methylmercapto benzothiazole | Activator slightly yellow |
| 10 | Santocure MBS | Activator cloudy |
| 12 | Santocure CBS | Activator yellow with particles |
| 14 | DMPT | yellow |
| 15 | 2,2 dithiodipyridine | yellow |
| 16 | 2-methyl-5-nitrobenzothiazole | Activator clear |
| 17 | 2,6 dichlorobenzothiazole | Activator clear |
| 18 | 5-methoxy-2-methylbenzothiazole | Activator clear |
| 19 | 6-methoxy-2-methylbenzothiazole | Activator clear |
| 20 | 2,5-dimethylbenzothiazole | Activator clear |
| 21 | 2-methyl-5-benzothiazolol | Activator slightly yellow |
| 22 | 2-methyl-β-naphthothiazole | Activator clear |
| 23 | CONTROL; 2-[(tert butylamino)thio]benzothiazole | Activator cloudy |

Humidity Studies

Humidity studies were also performed on viable potential replacement activators by placing a batch of freshly prepared sample syringes of the 2-part cyanoacrylates in an oven at 40° C. with 98% humidity for 3 weeks and also samples for 6 weeks. Gel times were again recorded as previous and comparison results can be seen in Table 6 below.

TABLE 6

Results of humidity study

| | Activator (Part B) | Gel time pre-humidity 1 | Gel time post - humidity (3 weeks) | Gel time post - humidity (6 weeks) |
|---|---|---|---|---|
| 2 | 2-methyl-1,3-benzothiazole (2-Me BT) | 10-20 s | 15-30 s | 15-3 s |
| 8 | 5-chloro-2-methylbenzothiazole (5-Cl-2-MeBT) | 7-8 mins | 6 mins 30 s-7 mins 30 s | 5 mins-5 mins 30s |
| 9 | 2-(methylmercapto) benzothiazole (2-Me-mercapto BT) | 13 mins-14 mins 30 s | 9-10 mins | 5 mins 30 s-7 mins 45 s |
| 10 | 2-(morpholin-4-ylthio)-1,3-benzothiazole (Santocure MBS) | 7 mins 30 s-8 mins 15 s | 7 mins 30 s-8 mins 30 s | 6 mins 30 s-8 mins 30 s |
| 12 | 2-[(cyclohexylamino)thio]-benzothiazole (Santocure CBS) | 1 min 30 s-2 mins 10 s | 2 mins-2 mins 45 s | >20 mins, <1 hr 30 mins |
| 14 | N,N,4-trimethylaniline (DMPT) Control | 60-75 s | 40-70 s | 30-50 s |
| 15 | 2,2-Dithiodipyridine | 30-50s s | 20-30 s | 10-20 s |
| 23 | 2-[(tert butylamino)thio]benzothiazole (Control) | 1 min 15 s-1 min 45 s | 1 min 10 s-1 min 40 s | >20 mins, <1 hr 30 mins |

Adhesive performance was assessed using standard lap shear strength tests (ASTM D1002-05). Adhesive bond strength is determined by stressing a single adhesive overlap joint with the application of a tensile force parallel to the bond area and to the major axis of the test specimen. These were performed on (metal to metal) 1×4×0.063 inch mild steel and aluminium substrates with 0.5 sq. inch overlap of the substrate, and the 2-part cyanoacrylate sample between the substrate. The cyanoacrylate sample was allowed to cure at room temperature for the time indicated below. The resulting bond strengths were measured using an Instron instrument with the following test conditions: MS and Al, IPA wipe, 24 hour cure at RT. Results obtained can be observed in FIG. 1.

The words "comprises/comprising" and the words "having/including" when used herein with reference to the present invention are used to specify the presence of stated features, integers, steps or components but does not preclude the presence or addition of one or more other features, integers, steps, components or groups thereof. It is appreciated that certain features of the invention, which are, for clarity, described in the context of separate embodiments, may also be provided in combination in a single embodiment. Conversely, various features of the invention, which are for brevity, described in the context of a single embodiment, may also be provided separately or in any suitable sub-combination.

The invention claimed is:

1. A two-part cyanoacrylate adhesive composition comprising:
Part A: a cyanoacrylate; and
Part B:
(a) a 2-substituted benzothiazole, and
(b) a plasticizer selected from the group consisting of triacetin, dioctyl phthalate, dibutyl phthalate, trioctyl trimellitate, dioctyl adipate, dioctyl glutarate, butyl cyanoacetate, trimethyl trimellitate, diethylene glycol dibenzoate, diethyl malonate, triethyl-O-acetyl citrate, benzylbutyl phthalate, dipropylene glycol dibenzoate, diethyl adipate, tributyl-O-acetyl citrate, dimethyl sebacate, tributyl-O-acetyl citrate, triethyl-O-acetyl citrate, dipropylene glycol dibenzoate, diethylene glycol dibenzoate, benzylbutyl phthalate, dibutyl adipate, dibutyl sebacate, dicapryl adipate, dicapryl phthalate, diethyleneglycol dibenzoate, diethyl adipate, diethyl glutarate, diethyl malonate, diethyl pimelate, diisononyl phthalate, dimethyl adipate, dimethyl glutarate, dimethyl sebacate, dioctyl phthalate, diprophyleneglycol dibenzoate, ethyl caproate, glyceroltrioleate, isopropyl myristate, methyl laurate, methyl stearate, pentaerythritol tetraacrylate, pentaerythriotoltetrabenzoate, poly(neopentyl glycoladipate), tributyl-O-acetyl citrate, tricapryl trimellithate, triethyl-O-acetyl citrate, trihexyl trimellithate, tris(isopropyl phenyl)phosphate, trimethyl trimellithate, trioctyl trimellithate, and combinations thereof, wherein the 2-substituted benzothiazole is selected from the group consisting of:

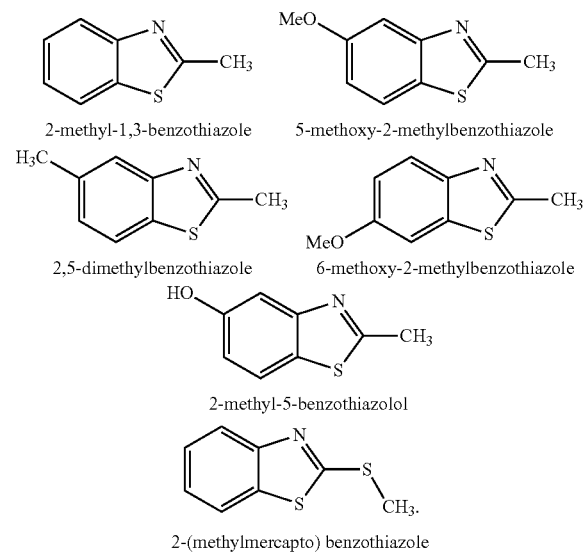

2-methyl-1,3-benzothiazole   5-methoxy-2-methylbenzothiazole 2,5-dimethylbenzothiazole   6-methoxy-2-methylbenzothiazole 2-methyl-5-benzothiazolol 2-(methylmercapto) benzothiazole 2. A cyanoacrylate composition according to claim 1, wherein Part A and Part B are present in a 10:1 by volume ratio and packaged in a dispensing pack such that Part A and Part B are separated.

3. A cyanoacrylate composition according to claim 2, wherein the dispensing pack is a dual barrel chamber syringe.

* * * * *